Feb. 17, 1925.

I. SATAKE

RESERVE TANK

Filed Aug. 6, 1924

1,526,720

Inventor
I. Satake
By J. P. Lorin
Attorney

Patented Feb. 17, 1925.

1,526,720

UNITED STATES PATENT OFFICE.

IWAJIRO SATAKE, OF SEATTLE, WASHINGTON.

RESERVE TANK.

Application filed August 6, 1924. Serial No. 730,487.

*To all whom it may concern:*

Be it known that IWAJIRO SATAKE, a citizen of Japan, residing at Seattle, in the county of King and State of Washington, has invented certain new and useful Improvements in Reserve Tanks, of which the following is a specification.

The invention is directed to a reserve fuel tank for motor vehicles and the like, wherein such reserve tank is provided as supplemental tank for the main tank, is filled when the latter is filled, and is emptied into the main tank at the will of the driver.

The invention is illustrated in the accompanying drawings in which:—

Figure 1:
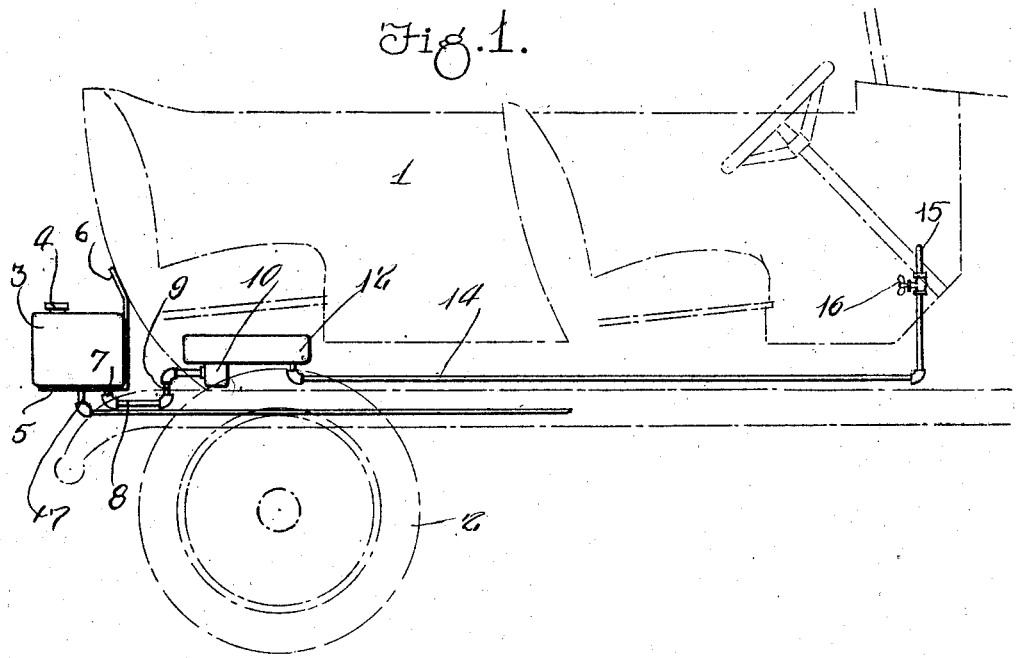
Figure 1 is a view in elevation showing the application of the improved reserve tank to an automobile.
Figure 2:
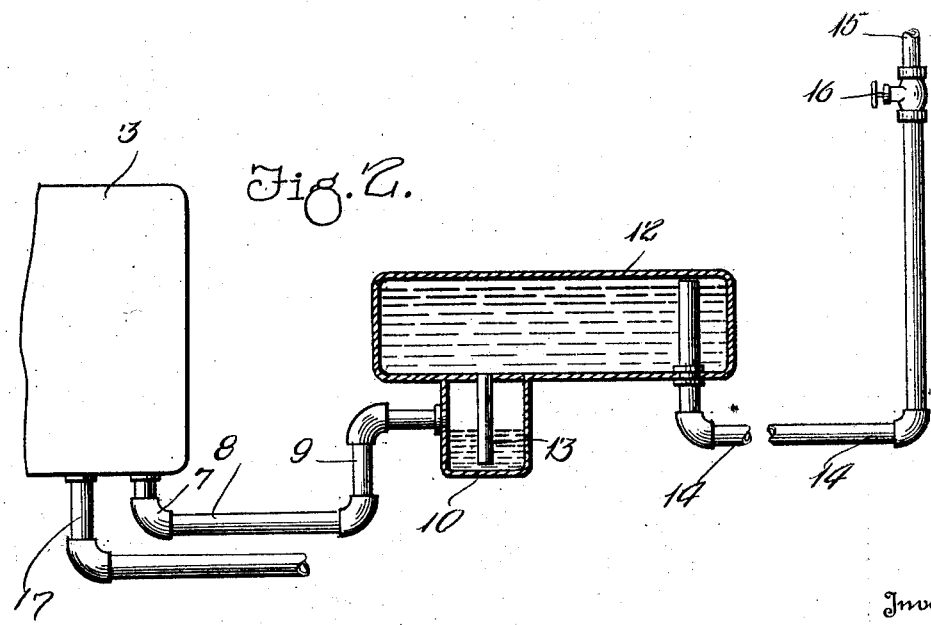
Figure 2 is an enlarged view in elevation partly in section and showing the relation of the main and reserve tanks.

The automobile indicated at 1, having the usual wheels 2 is provided, preferably in the rear with the main fuel tank 3 having a filling cap 4 and supporting strap 5 secured to the automobile at 6. The usual drain pipe 7 of the main tank is provided with an extension 8 leading through a pipe 9 into a receptacle 10, the latter being arranged below the reserve tank 12 and communicating therewith through a pipe 13, the lower open end of which terminates below the open end of the pipe 9. Leading from the reserve tank is an air pipe 14, one end of which opens within the reserve tank near the upper end thereof, while the other end is extended to a position convenient to the driver terminating on a level above the reserve tank and controlled by a valve 16.

When the main tank 3 is filled the fuel will pass through the pipes 8 and 9 and into the reserve tank, filling the latter, it being assumed that the valve 16 is open during the filling of the reserve tank. After filling the main tank, the valve 16 is closed, and fuel is used from the main tank through the usual supply pipe 17, in the usual manner. When the action of the engine indicates that the fuel in the main tank is exhausted, the driver by opening valve 16, to admit air to the reserve tank will cause the fuel therefrom to flow into the main tank for use.

As the quantity of fuel in the reserve tank is known, the driver is advised as to his possible range of travel on such reserve tank fuel, and is thus enabled to reach a supply house for replenishing his fuel. It is thus necessary to hold the fuel in the reserve tank until the driver acts to admit such fuel to the main tank, as by this condition the driver may readily determine how far he is enabled to travel before all supply is completely exhausted. The fuel in the reserve tank will not flow to the main tank when the latter is exhausted, until elimination of the air trap in the receptacle 10, as will be obvious.

What I claim is:

1. An automobile having a main fuel tank, a reserve tank, a trap arranged below and carried by the reserve tank, a pipe leading from the fuel tank and opening into said trap, an air pipe opening within the reserve tank and leading to a point convenient to the driver, and means controlling the admission of air to said air pipe.

2. The combination with an automobile having the main fuel tank, of a reserve tank which is approximately in the same plane with the bottom of the main tank, a relatively small cup and a pipe which joins the cup to the reserve tank and one of whose ends projects into the cup, a distance approximately equal to the depth of the cup, a pipe which connects the main tank with the cup, the entering point of that pipe within the cup being above the mouth of the pipe which connects the cup with the reserve tank, whereby the contents of the supplemental tank is sealed from any outflow, a pipe extending forwardly from the reserve tank, and air control means at the terminal of that pipe.

In testimony whereof I affix my signature.

IWAJIRO SATAKE.